US012588608B2

(12) United States Patent
Willenbücher et al.

(10) Patent No.: US 12,588,608 B2
(45) Date of Patent: Mar. 31, 2026

(54) MOBILE FORESTRY MACHINE

(71) Applicant: Bernward Welschof, Grossostheim (DE)

(72) Inventors: Michael Willenbücher, Oberzent (DE); Claus Hofmann, Haibach (DE); Bernward Welschof, Grossostheim (DE)

(73) Assignee: Bernward Welschof, Grossostheim (DE)

( * ) Notice: Subject to any disclaimer, the term of this patent is extended or adjusted under 35 U.S.C. 154(b) by 535 days.

(21) Appl. No.: 18/005,374

(22) PCT Filed: Jul. 1, 2021

(86) PCT No.: PCT/EP2021/068182
§ 371 (c)(1),
(2) Date: Jan. 13, 2023

(87) PCT Pub. No.: WO2022/012951
PCT Pub. Date: Jan. 20, 2022

(65) Prior Publication Data
US 2023/0263112 A1 Aug. 24, 2023

(30) Foreign Application Priority Data
Jul. 16, 2020 (DE) ..................... 10 2020 118 839.0

(51) Int. Cl.
*A01G 23/00* (2006.01)
*B60H 1/00* (2006.01)
*B60H 1/18* (2006.01)

(52) U.S. Cl.
CPC ....... *A01G 23/006* (2013.01); *B60H 1/00592* (2013.01); *B60H 1/18* (2013.01)

(58) Field of Classification Search
CPC .. A01G 23/00; A01G 23/006; A01G 23/0955; B60H 1/00592; B60H 1/18
(Continued)

(56) References Cited

U.S. PATENT DOCUMENTS 10,723,390 B2 7/2020 Salter et al.
2023/0003594 A1* 1/2023 Willenbücher .......... B66D 1/08
(Continued)

FOREIGN PATENT DOCUMENTS

DE 102012004821 A1 9/2013
DE 102018104810 A1 9/2019
(Continued)

*Primary Examiner* — Steven O Douglas
(74) *Attorney, Agent, or Firm* — The Webb Law Firm

(57) ABSTRACT

The present disclosure relates to a mobile machine, in particular a forestry machine, which has a chassis and a drive unit which has an internal combustion engine and at least one hydraulic pump driven by the internal combustion engine, which hydraulic pump supplies a hydraulic system with pressure medium. The internal combustion engine with the hydraulic pump is located in an engine compartment formed inside a hood-like housing. The machine has no driver workplace for an operator and is in the form of a machine that can be remotely controlled by means of a remote control. Inside the hood-like-housing there is at least one storage compartment that can be heated by the waste heat of the drive unit.

12 Claims, 4 Drawing Sheets

(58) Field of Classification Search
USPC ....................................................... 296/24.41
See application file for complete search history.

(56) References Cited

U.S. PATENT DOCUMENTS

2023/0284573 A1* 9/2023 Willenbücher ......... B60P 1/433
2023/0373764 A1* 11/2023 Welschof ................. B66D 1/36

FOREIGN PATENT DOCUMENTS

DE        202019104164 U1     9/2019
WO         2008129120 A1    10/2008

* cited by examiner

MOBILE FORESTRY MACHINE

CROSS-REFERENCE TO RELATED APPLICATIONS

This application is the United States national phase of International Application No. PCT/EP2021/068182 filed Jul. 1, 2021, and claims priority to German Patent Application No. 10 2020 118 839.0 filed Jul. 16, 2020, the disclosures of which are hereby incorporated by reference in their entireties.

BACKGROUND OF THE INVENTION

Field of the Invention

The invention relates to a mobile machine, in particular a forestry machine, which has a chassis and a drive unit which has an internal combustion engine and at least one hydraulic pump driven by the internal combustion engine, which hydraulic pump supplies a hydraulic system with pressure medium, wherein the internal combustion engine with the hydraulic pump is located in an engine compartment formed inside a hood-like housing, wherein the machine has no driver workplace for an operator and is in the form of a machine that can be remotely controlled by means of a remote control.

Description of Related Art

A remotely controlled machine of this type is known from DE 10 2018 104 810 A1.

Mobile machines in the form of forestry machines, for example, are used for harvesting timber and forwarding the felled trees to a forest road. Because the machine does not have a driver workplace for an operator, a machine of this type can have a compact and lightweight construction that allows it to be used in forested areas that are not suitable for conventional large machines. The machine can be operated easily and without long and extensive training by a wireless remote control. As a result of the remote control capability, there is also no risk to the driver or the operator on a slope or in the forest.

Mobile machines of this type are operated outdoors over long periods of time and in all weather conditions by the operator by means of the remote control, in which case the operator is also exposed to the weather conditions. To improve the on-the-job comfort of the operator operating the machine, a desirable feature of the machine would be the operator's ability to carry food and drink in the machine and keep it warm, as well as to carry articles of clothing, such as gloves, for example, and keep them warm and dry, in the machine. The machine of the prior art described in DE 10 2018 104 810 A1 does not offer any solution that meets these requirements.

SUMMARY OF THE INVENTION

The object of this invention is to provide a machine of the type described above which represents an improvement in terms of the on-the-job comfort of the operator operating the machine.

This object is accomplished in that inside the hood-like housing there is at least one storage compartment that can be heated by the waste heat given off by the drive unit.

The source of the waste heat of the drive unit that heats the at least one storage compartment can be the internal combustion engine or the at least one hydraulic pump or hoses or pipes of the drive unit.

One or more storage compartments that can be heated by the waste heat of the drive unit make it possible to carry food and beverages, in particular tea or coffee, and articles of clothing such as gloves, for example, and to keep them warm or hot, which achieves a higher level of on-the-job comfort for the operator of the machine.

The at least one storage compartment is thereby located inside the hood-like housing and is therefore an integral part of the hood-like housing, as a result of which the at least one storage compartment does not result in an increase in the outside dimensions of the compact machine.

According to one advantageous embodiment of the invention, inside the hood-like housing there is a first storage compartment that can be heated by the waste heat of at least one hot component of the drive unit, and/or inside the hood-like housing there is at least one second storage compartment that can be heated by the waste heat of at least one warm component of the drive unit.

Examples of hot components of the drive unit are an exhaust system of the internal combustion engine and in particular a manifold and a muffler of the exhaust system. Examples of warm components of the drive unit are the hydraulic pumps and a radiator device of the internal combustion engine or a radiator device of the hydraulic system.

The first storage compartment therefore forms a hot compartment which is located near a hot component of the drive unit, the waste heat from which can be used to heat it. The second storage compartment therefore forms a warming compartment which is located near a warm component of the drive unit, the waste heat from which can be used to warm it.

The first storage compartment that can be heated by the waste heat of the hot component of the drive unit therefore forms a hot compartment that can be heated by the waste heat of the hot component of the drive unit, preferably to temperatures in the range of 60-95° C. and is therefore suitable for carrying and heating food and beverages, for example tea or coffee, and keeping them hot. The second storage compartment that can be warmed by the waste heat of the warm component of the drive unit therefore forms a warming compartment that can be heated by the waste heat of the warm component of the drive unit, preferably to temperatures in the range of 30-70° C. and is therefore suitable for carrying and drying articles of clothing, for example gloves, and keeping them warm.

According to one advantageous embodiment of the invention, inside the hood-like housing there is an exhaust system of the internal combustion engine comprising a muffler and a radiator device of the hydraulic system or of the internal combustion engine, wherein inside the hood-like housing, adjacent to the muffler, is the first storage compartment that can be heated by the waste heat of the exhaust system, in particular of the muffler, and/or inside the hood-like housing, adjacent to the radiator device, is the second storage compartment that can be heated by the waste heat of the radiator device. It is thereby possible in a simple manner to form a hot compartment that can be heated by the waste heat of the muffler of the internal combustion engine as a hot component of the drive unit, which is thereby suitable for carrying and heating food and beverages such as tea or coffee, for example, and keeping them hot. It also thereby becomes possible in a simple manner to form the warming compartment that can be heated by the waste heat of the internal combustion engine or of the hydraulic system as warm components of the drive unit, whereby said warming compartment can thereby be used for carrying and drying articles of clothing such as gloves, for example, and keeping them warm.

According to one advantageous embodiment of the invention, the muffler is located in a radiator and exhaust gas space located inside the hood-like housing above the engine compartment, wherein the first storage compartment is located in the radiator and exhaust gas space adjacent to the muffler. The location of the first storage compartment in the radiator and exhaust gas space adjacent to the muffler makes possible in a simple manner a heating and control of the temperature of the first storage compartment by the waste heat of the muffler.

According to one advantageous embodiment of the invention, the radiator device is located in the radiator and exhaust gas space located inside the hood-like housing above the engine compartment, wherein the second storage compartment is located in the radiator and exhaust gas space adjacent to the radiator device. The location of the second storage compartment in the radiator and exhaust gas space adjacent to the muffler makes possible in a simple manner a heating and control of the temperature of the second storage compartment by the waste heat of the radiator device.

According to one advantageous embodiment of the invention, the muffler is located in a noise reduction enclosure located in the radiator and exhaust gas space, whereby one side wall of the noise reduction enclosure simultaneously forms a side wall of the first storage compartment. The noise reduction enclosure therefore forms a sound reduction box around the muffler and is heated by the waste heat of the muffler. If a side wall of the noise reduction enclosure simultaneously forms a side wall of the first storage compartment, it thereby becomes possible with a simple construction to achieve a transfer of heat from the noise reduction enclosure to the first storage compartment to heat the first storage compartment with the waste heat of the muffler.

With regard to a simple construction, it is advantageous if, according to one advantageous embodiment of the invention, the first storage compartment is located to the side of and vertically above the muffler. When the first storage compartment is located to the side of and vertically above the muffler, using a simple construction the first storage compartment integrated into the hood-like housing can be heated by the waste heat of the muffler.

According to one advantageous embodiment of the invention, the second storage compartment has a side wall that lies in the path of the exhaust flow of the radiator device. As a result, it becomes possible with a simple construction to achieve a transfer of heat from the exhaust flow and thus from the waste heat flow of the radiator device to the second storage compartment to heat the second storage compartment with the waste heat from the radiator device.

Particular advantages can be achieved if, according to one advantageous embodiment of the invention, the radiator device is oriented horizontally in the radiator and exhaust gas space, with an exhaust flow directed vertically upward. This orientation makes it possible to discharge the waste heat from the radiator device via a large air outlet on the top of the machine upward to the environment.

With regard to a simple construction, it is advantageous if, according to one advantageous embodiment of the invention, the second storage compartment is located to the side of and vertically above the muffler. When the second storage compartment is located to the side of and vertically above the radiator device, with a simple construction the second storage compartment integrated into the hood-like housing can be warmed and heated by the waste heat of the radiator device that is guided upward to the air outlet.

According to one advantageous embodiment of the invention, the at least one storage compartment is accessible by means of a cover located in a top wall or a side wall of the hood-like housing. Access to the corresponding storage compartment can be achieved in a simple manner by means of a cover located in the top wall or the side wall of the hood-like housing, According to one advantageous development of the invention, the at least one storage compartment is provided with an electrical auxiliary heater. With an auxiliary heater of this type, the corresponding storage compartment can be kept at the proper temperature if the waste heat of the drive unit is insufficient, for example when the machine is shut off during longer break periods.

According to one advantageous development of the invention, the at least one storage compartment is provided with an individual insulating shutter device to keep the compartment at the desired temperature. With an insulating shutter device, which can have one or more shutters, the temperature in a corresponding storage compartment can easily be set by opening or closing the insulating shutter device.

BRIEF DESCRIPTION OF THE DRAWINGS

Additional advantages and details of the invention are described in greater detail below with reference to the exemplary embodiments illustrated in the accompanying schematic figures, in which.

DESCRIPTION OF THE INVENTION

Figure 1:
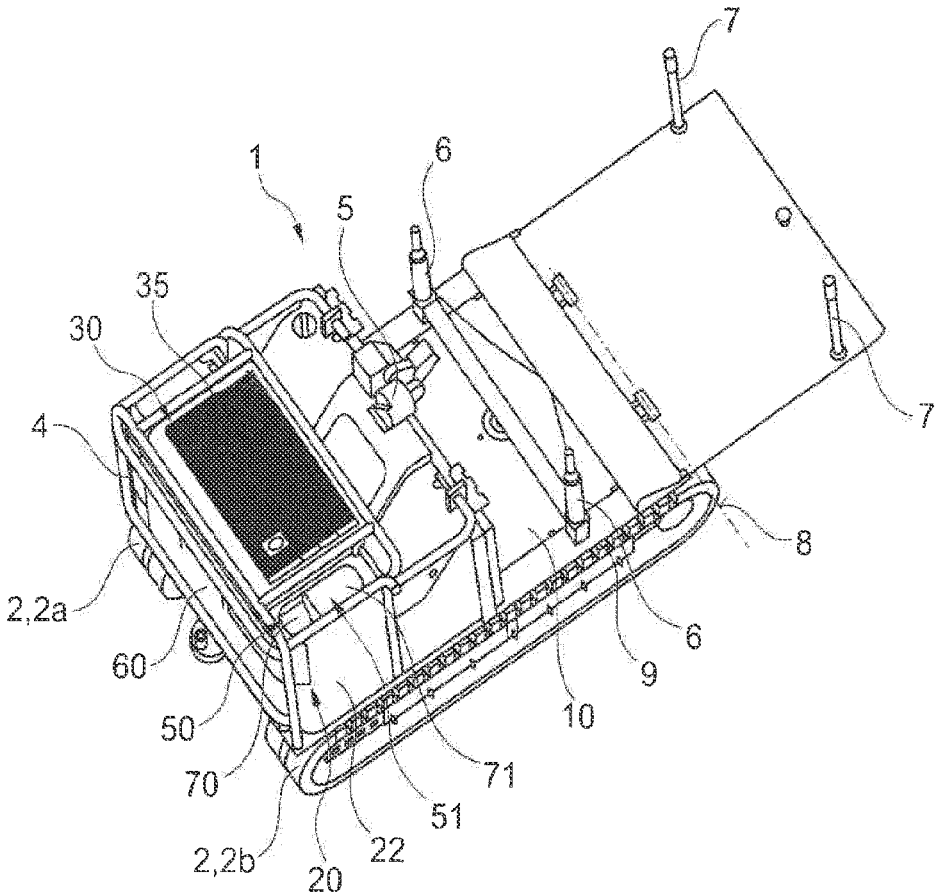
FIG. 1 is a view in perspective of a mobile machine according to the invention.

FIG. 1 is a view in perspective of a remotely controlled mobile machine 1 according to the invention, for example a forestry machine.

The mobile machine 1 comprises a chassis 2, which in the illustrated embodiment is formed by two tracks 2a, 2b, each of which is driven by a hydraulic traction drive motor, for example.

Figure 3:
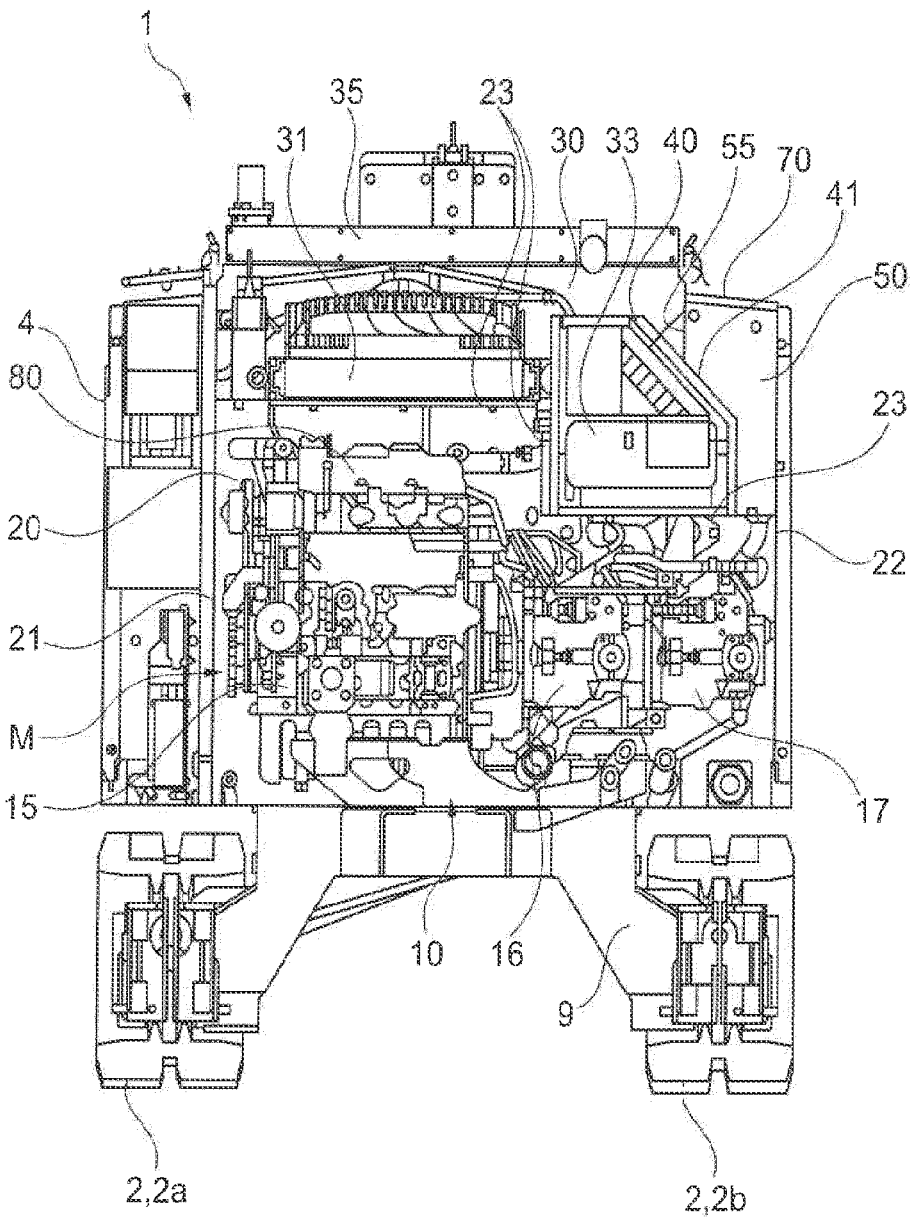
FIG. 3 is a section along line A-A in FIG. 2.
Figure 4:
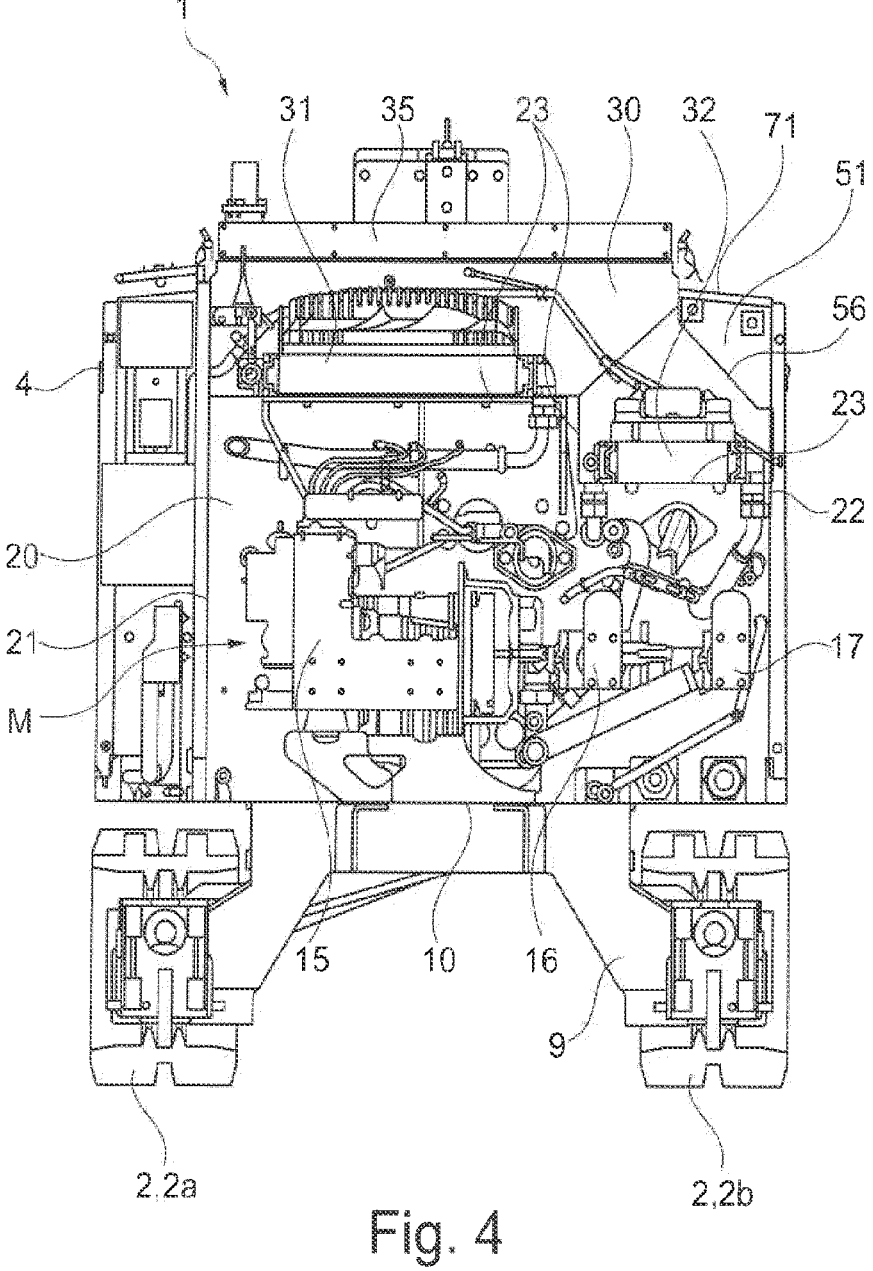
FIG. 4 is a section along line B-B in FIG. 2.

As the drive source, the mobile machine 1—as shown in FIGS. 3 and 4—has a drive unit M which is located inside the forward section of a hood-like or shaped housing 4. The machine 1 does not have a driver workplace for an operator and can be operated remotely by an operator by means of a remote control which is not illustrated in any further detail.

In the illustrated embodiment, the machine 1 also has a rope winch 5, a stanchion 6 and an adjustable ramp plate 7, which is located on the rear of a vehicle body 9 of the machine 1 so that it can be adjusted around a horizontal transverse vehicle axis 8.

The stanchion 6 is located in the vertical direction above a base plate 10 of the vehicle body 9.

The hood-like housing 4 in which the drive unit M and the rope winch 5 are located forms a forward half of the machine 1. The base plate 10 with the stanchion 6 on it forms a rear half of the machine 1. The drive unit M is located in a forward section of the hood-like housing 4 and the rope winch 5 in a rear section of the hood-like housing 4.

The drive unit M—as is visible in FIGS. 3 and 4—has an internal combustion engine 15 and at least one hydraulic pump 16, 17 driven by the internal combustion engine 15, which hydraulic pump supplies a hydraulic system of the machine with pressure medium. The internal combustion engine 15—as shown in FIGS. 3 and 4—is oriented with a longitudinal axis in the transverse direction of the vehicle and drives the at least one hydraulic pump 16, 17, for example a variable displacement pump, which supplies the hydraulic system of the machine 1 with pressure medium. As consumers, the hydraulic system comprises the traction drive motors, a hydraulic motor that drives the rope winch 5 and additional hydraulic consumers, for example hydraulic cylinders for adjusting the ramp plate 7.

The internal combustion engine 15 and the hydraulic pumps 16, 17 and thus the drive unit M are located in a closed engine compartment 20 located inside the hood-like housing 4. The engine compartment 20 is bounded on the sides by sheet metal side walls 21, 22, on the bottom by the base plate 10 and on the top by the cover plate 23. The sheet metal side wall 22 thereby forms a lateral exterior wall of the hood-like housing 4. The cover plate 23 is bent at a right angle and, in the vicinity of the internal combustion engine 15, has a section that is higher than in the vicinity of the hydraulic pumps 16, 17. In the longitudinal direction of the vehicle, toward the rear and front, the engine compartment 20 is bounded by a front wall and a rear wall. The engine compartment 20 is preferably provided with insulation (thermal insulation and acoustic insulation).

In the vertical direction, above the engine compartment 20 in which the internal combustion engine 15 and the hydraulic pumps 16 and 17 are located, in the hood-like housing 4 there is a radiator and exhaust gas space 30 in which are a first radiator device 31, a second radiator device 32 and an exhaust system with a muffler 33 of the internal combustion engine 15. In the illustrated exemplary embodiment, the first radiator device 31 is a radiator device of the internal combustion engine 15 and the second radiator device 32 is a radiator device, for example a hydraulic fluid cooler, of the hydraulic system. It goes without saying that the radiator devices 31, 32 can also have interchanged functions, so that the first radiator device 31 is in the form of a radiator device, for example a hydraulic fluid radiator, of the hydraulic system and the second radiator device 32 is in the form of a radiator device for the internal combustion engine 15.

The radiator device 31 and/or the radiator device 32 can be provided with a driven fan which generates a cooling airflow. The radiator and exhaust gas space 30 is bounded on the side by the sheet metal side walls 21, 22 and on the bottom by the cover plate 23 of the engine compartment 20. The radiator and exhaust gas space 45 is essentially open on top and is provided with an air exhaust grate 35.

The radiator device 31 of the internal combustion engine 15 and/or the radiator device 32 of the hydraulic system are preferably oriented horizontally and have an air outlet that directs a cooling airflow vertically upward. The radiator device 31 of the internal combustion engine 15 and/or the radiator device 32 of the hydraulic system therefore make it possible to discharge air and heat upward. The radiator device 31 of the internal combustion engine 15 is located on the elevated section of the cover plate 23 above the internal combustion engine 15 and the radiator device 32 is located on the lower section of the cover plate 23 above the hydraulic pumps 16, 17.

The muffler 33 is also located on the lower section of the cover plate 23 above the hydraulic pumps 16, 17. The muffler 33 is also located in a noise reduction enclosure 40 located in the radiator and exhaust gas space 30.

Figure 2:
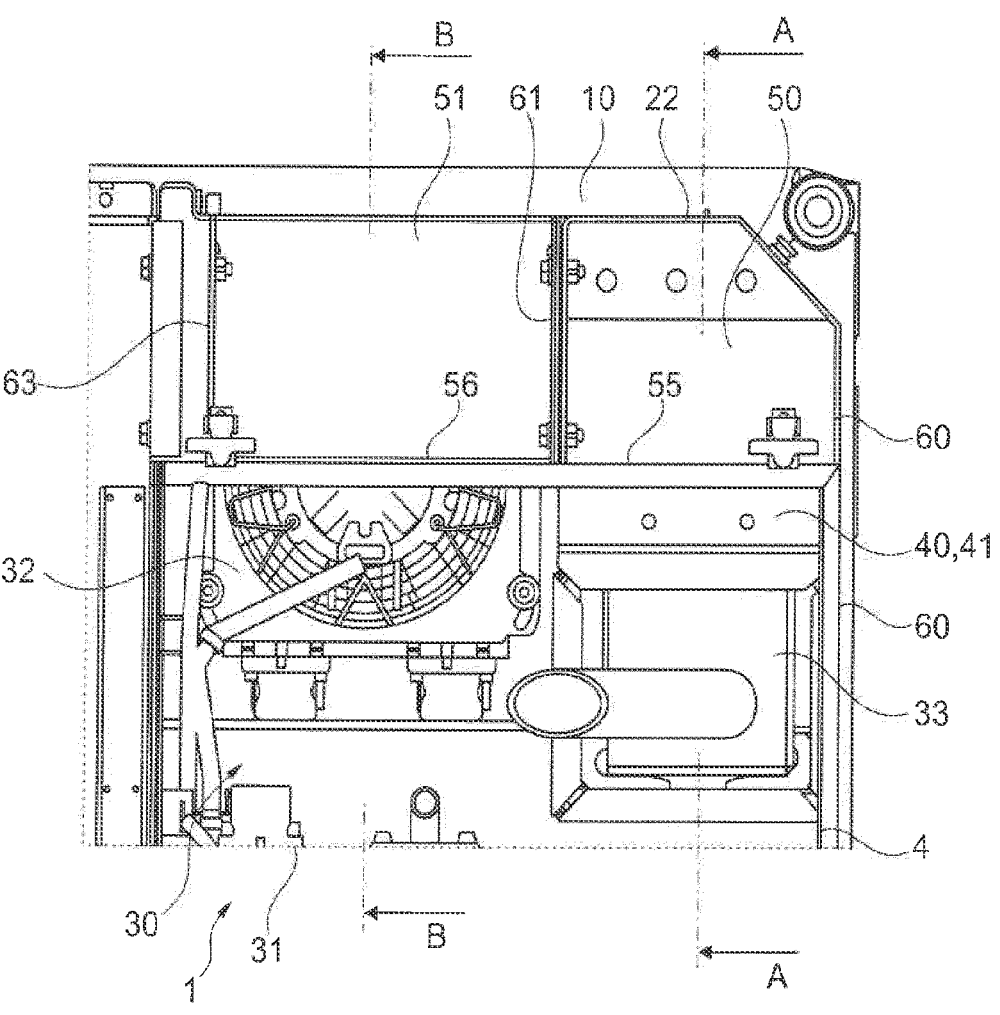
FIG. 2 shows the machine from FIG. 1 in an overhead view on the forward section of the machine.

FIG. 2 is an overhead view of the radiator and exhaust gas space 30 located above the engine compartment with the air outlet grate 35 removed, showing the muffler 33, the radiator device 32 of the hydraulic system and the radiator device 31 of the internal combustion engine 15. As shown in FIG. 2, the radiator device 31 of the internal combustion engine 15 and the radiator device 32 of the hydraulic system are located next to each other in the transverse direction of the vehicle and the muffler 33 is located forward of the radiator device 32 in the longitudinal direction of the vehicle.

According to the invention—as is visible in FIGS. 2 to 4—located inside the hood-like housing 4 is at least one storage compartment 50 or 51 that can be heated by the waste heat of the drive unit M. In the illustrated exemplary embodiment there are two storage compartments 50, 51, wherein inside the hood-like housing 4 there is a first storage compartment 50 that can be heated by the waste heat of at least one hot component of the drive unit M and inside the hood-like housing 4 there is at least one second storage compartment 51 that can be heated by the waste heat of at least one warm component of the drive unit M.

In the illustrated exemplary embodiment, the hot component of the drive unit M that heats the first storage compartment 50 is formed by the muffler 33. Alternatively, the hot component of the drive unit M that heats the first storage compartment 50 can be formed by a manifold 80 of the exhaust system of the internal combustion engine 15. In the illustrated exemplary embodiment, the warm component of the drive unit M that warms the second storage compartment 51 is formed by the radiator device 32. Alternatively, the warm component of the drive unit M that warms the second storage compartment 51 can be formed by the radiator device 31 or by one or both hydraulic pumps 16 and 17 or hoses or pipes connected to the hydraulic pump 16 or 17.

According to the invention, therefore, located inside the hood-like housing 4—as shown in FIGS. 2 and 3—near or adjacent to the hot component of the drive unit M, in the illustrated exemplary embodiment near or adjacent to the muffler 33, is the first storage compartment 50 that can be heated by the waste heat of the hot component of the drive unit M. The first storage compartment 50 is therefore designed as a hot compartment, which is provided for carrying, warming and keeping hot foods and beverages, in particular tea or coffee, hot.

According to the invention, therefore, located inside the hood-like housing 4—as shown in FIGS. 2 and 4—near or adjacent to the warm component of the drive unit M, in the illustrated exemplary embodiment near or adjacent to the radiator device 32, is the second storage compartment 51 that can be warmed by the waste heat of the warm component of the drive unit M. The second compartment 51 is therefore designed as a warming compartment, which is provided for carrying, heating and keeping articles of clothing, for example gloves, warm.

The first storage compartment 50 is hereby located in the radiator and exhaust gas space 30 near or adjacent to the muffler 33.

The second storage compartment 51 is accordingly located in the cooling and exhaust gas space 30 near or adjacent to the radiator device 32.

The first storage compartment 50 is bounded on the outside by the sheet metal side wall 22 and on the inside by a vertical sheet metal partition 55 and a side wall 41 of the noise reduction enclosure 40. The first storage compartment 50 extends toward the front in the longitudinal direction of the vehicle to the forward wall 60 of the hood-like housing 4 and toward the rear to a rear wall 61. The first storage compartment 50 is located to the side of and vertically above the muffler 33 and in the lateral area next to the muffler 33 extends to the cover plate 23. The thermal transport from the hot component, in the illustrated exemplary embodiment from the muffler 33, to the first storage compartment 50 preferably takes place via radiation from the hot component and/or via the mass transport of hot air and/or by thermal conduction via the supporting components that hold the hot component in place, which can be made of metal or aluminum.

The second storage compartment 51 is bounded on the outside by the sheet metal side wall 22 and on the inside by a side wall 56 which lies in the exhaust flow of the radiator device 32. In the illustrated embodiment, the side wall 56 extends diagonally downward and is connected at its lower end to the sheet metal side wall 22. The second storage compartment 51 extends forward in the longitudinal direction of the vehicle to the back wall 61 of the first storage compartment 50 and to the rear to a rear wall 63. The second storage compartment is located to the side of and vertically above the radiator device 32 and extends in the transverse direction of the vehicle from the sheet metal side wall 22 over approximately one-half of the surface area of the radiator device 32. The thermal transport from the warm component, in the illustrated exemplary embodiment from the radiator device 32, to the second storage compartment 51 preferably takes place via radiation from the warm component and/or via the mass transport of warm air and/or by thermal conduction via the supporting components that fasten the warm component in place, which can be made of metal or aluminum.

The first storage compartment 50—as shown in FIG. 1—is accessible by means of a cover 70 located in a top wall of the hood-like housing 4.

The second storage compartment 51—as shown in FIG. 1—is accessible by means of a cover 71 located in the top wall of the hood-like housing 4.

The cover 70 and the cover 71 are thereby located next to the air outlet grate 35 in the transverse direction of the vehicle.

The first storage compartment 50 is therefore in the form of a storage compartment enclosed by the walls 22, 41, 55, 60, 61, 23 and the cover 70.

The second storage compartment 51 is therefore in the form of a storage compartment enclosed by the walls 22, 56, 61, 63 and the cover 71.

The invention claimed is:

1. A mobile forestry machine comprising:
a chassis; and
a drive unit comprising:
   an internal combustion engine; and
   at least one hydraulic pump driven by the internal combustion engine,
wherein the at least one hydraulic pump supplies a hydraulic system with pressure medium,
wherein the internal combustion engine with the at least one hydraulic pump is located in an engine compartment formed inside a hood-shaped housing,
wherein the machine has no driver workplace for an operator and is configured to be remotely controlled by a remote control, wherein inside the hood-shaped housing there is at least one storage compartment that is configured to be warmed by the waste heat of the drive unit, and
wherein each storage compartment is provided with an insulating shutter device for temperature control.

2. The mobile forestry machine according to claim 1, wherein the at least one storage compartment comprises a first storage compartment and a second storage compartment, and
wherein the first storage compartment is configured to be heated by the waste heat of at least one hot component of the drive unit, and the second storage compartment is configured to be warmed by the waste heat of at least one warm component of the drive unit.

3. The mobile forestry machine according to claim 2, wherein inside the hood-shaped housing there is an exhaust system of the internal combustion engine comprising a muffler and a radiator device of the hydraulic system or of the internal combustion engine,
wherein inside the hood-shaped housing, adjacent to the muffler, is the first storage compartment that is configured to be heated by the waste heat of the muffler, and
wherein inside the hood-shaped housing, adjacent to the radiator device, is the second storage compartment that is configured to be warmed by the waste heat of the radiator device.

4. The mobile forestry machine according to claim 3, wherein the muffler is located in a radiator and exhaust gas space located inside the hood-shaped housing above the engine compartment, and wherein the first storage compartment is located in the radiator and exhaust gas space adjacent to the muffler.

5. The mobile forestry machine according to claim 3, wherein the radiator device is located in the radiator and exhaust gas space located inside the hood-shaped housing above the engine compartment, and wherein the second storage compartment is located in the radiator and exhaust gas space adjacent to the radiator device.

6. The mobile forestry machine according to claim 3, wherein the muffler is located in a noise reduction enclosure located in the radiator and exhaust gas space, and wherein one side wall of the noise reduction enclosure simultaneously forms a side wall of the first storage compartment.

7. The mobile forestry machine according to claim 3, wherein the first storage compartment is located to the side of and vertically above the muffler.

8. The mobile forestry machine according to claim 3, wherein the second storage compartment has a side wall that lies in the exhaust flow of the radiator device.

9. The mobile forestry machine according to claim 3, wherein the radiator device is oriented horizontally in the radiator and exhaust gas space and with an exhaust flow directed vertically upward.

10. The mobile forestry machine according to claim 3, wherein the second storage compartment is located to the side of and vertically above the radiator device.

11. The mobile machine according to claim 1, wherein the at least one storage compartment is accessible by means of a cover located in a top wall or a side wall of the hood-shaped housing.

12. The mobile forestry machine according to claim 1, wherein the at least one storage compartment is provided with an electric auxiliary heater.

\* \* \* \* \*